US008466523B2

(12) United States Patent
Chiou

(10) Patent No.: US 8,466,523 B2
(45) Date of Patent: Jun. 18, 2013

(54) DIFFERENTIAL PRESSURE SENSOR DEVICE

(75) Inventor: Jen-Huang Albert Chiou, Libertyville, IL (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 13/267,965

(22) Filed: Oct. 7, 2011

(65) Prior Publication Data

US 2013/0087863 A1 Apr. 11, 2013

(51) Int. Cl.
*G01L 9/00* (2006.01)

(52) U.S. Cl.
USPC .............. 257/417; 257/418; 257/419; 438/53

(58) Field of Classification Search
USPC ........................................................ 257/417
See application file for complete search history.

(56) References Cited

U.S. PATENT DOCUMENTS

| | | | |
|---|---|---|---|
| 3,739,644 A * | 6/1973 | Underwood et al. ............ | 73/721 |
| 4,287,501 A * | 9/1981 | Tominaga et al. .............. | 338/42 |
| 4,879,627 A | 11/1989 | Grantham | |
| 5,465,626 A * | 11/1995 | Brown et al. .................... | 73/715 |
| 5,631,191 A * | 5/1997 | Durand et al. ................. | 438/119 |
| 5,719,069 A * | 2/1998 | Sparks ............................ | 438/50 |
| 6,023,978 A * | 2/2000 | Dauenhauer et al. ........... | 73/720 |
| 6,581,468 B2 * | 6/2003 | Clifford ........................... | 73/715 |
| 7,073,375 B2 | 7/2006 | Parker et al. | |
| 7,077,008 B2 | 7/2006 | Pham et al. | |
| 7,808,365 B2 * | 10/2010 | Tojo et al. ........................ | 338/42 |
| 7,998,777 B1 * | 8/2011 | Gamage et al. ................. | 438/53 |
| 8,171,800 B1 * | 5/2012 | Chiou ............................. | 73/736 |
| 8,330,224 B2 * | 12/2012 | Kwa ............................. | 257/351 |
| 2002/0167058 A1 * | 11/2002 | Toyoda et al. ................. | 257/417 |
| 2004/0214370 A1 * | 10/2004 | Quinones et al. ............. | 438/106 |
| 2007/0052046 A1 * | 3/2007 | Chu et al. ...................... | 257/415 |
| 2009/0168388 A1 * | 7/2009 | Wong et al. .................... | 361/813 |
| 2010/0224004 A1 * | 9/2010 | Suminto et al. ................. | 73/727 |
| 2010/0300207 A1 | 12/2010 | Ding et al. | |
| 2010/0304518 A1 * | 12/2010 | Suminto et al. ................. | 438/51 |
| 2011/0018684 A1 | 1/2011 | Wang et al. | |
| 2012/0068356 A1 * | 3/2012 | Ahles et al. .................... | 257/774 |

FOREIGN PATENT DOCUMENTS

WO 2008/151972 A2 12/2008

OTHER PUBLICATIONS

Jen-Huang Albert Chiou "Differential Pressure Sensor Using Dual Backside Absolute Pressure Sensing" filed as U.S. Appl. No. 13/013,237 on Jan. 25, 2011.
International Search Report and Written Opinion dated Feb. 15, 2013, from corresponding International Patent Application No. PCT/US2012/054209.

* cited by examiner

*Primary Examiner* — David Vu
*Assistant Examiner* — Sitaramarao S Yechuri

(57) ABSTRACT

A MEMS differential pressure sensing element is provided by two separate silicon dies attached to opposite sides of a silicon or glass spacer. The spacer is hollow. If the spacer is silicon, the dies are preferably attached to the hollow spacer using silicon-to-silicon bonding provided in part by silicon oxide layers. If the spacer is glass, the dies can be attached to the hollow spacer using anodic bonding. Conductive vias extend through the layers and provide electrical connections between Wheatstone bridge circuits formed from piezoresistors in the silicon dies.

23 Claims, 10 Drawing Sheets

DIFFERENTIAL PRESSURE SENSOR DEVICE

BACKGROUND

Many silicon-based micro-sensors use so-called MEMS (microelectromechanical systems) technology to achieve low cost and high performance. One such a device is a MEMS pressure sensor, which is comprised of a small, thin silicon diaphragm onto which a piezoresistive circuit, normally a Wheatstone bridge, is formed. Diaphragm stresses caused by pressure applied to the diaphragm change the resistance values of the piezoresistors in the bridge circuit. An electronic circuit detects the resistance changes of the piezoresistive bridge and outputs an electrical signal representative of the applied pressure.

FIG. 1A is a cross-sectional view of a prior art differential pressure sensor 100, so named because it provides an output signal representative of the pressure difference between the top pressure and the bottom pressure on the diaphragm 122 of FIG. 1B of the differential pressure sensing element 110 shown in FIG. 1B. FIG. 1B shows a cross-sectional diagram of a differential pressure sensing element mounted inside the housing depicted in FIG. 1A.

In FIG. 1A, the pressure sensor 100 is comprised of a housing 104 that encloses a MEMS pressure sensing element 110 and an application-specific integrated circuit (ASIC) 106. One fluid pressure from liquids or gases is applied to the bottom of the diaphragm of the MEMS pressure sensing element through a pressure port 108 formed into the housing 104. The other fluid pressure from gases through the cover 107 is applied to the top of the gel 124 which passes the pressure to the top of the diaphragm of the MEMS pressure silicon sensing element (or silicon die). The MEMS pressure sensing element 110 is electrically connected to ASIC 106 by conductive wires 103, well-known in the prior art and which provide electrical connections between the ASIC 106 and the pressure sensing element 110. Conductive wires also connect the ASIC 106 to the leadframes 105 for the input and output voltages.

As stated above, FIG. 1B is a cross-sectional diagram of a prior art MEMS pressure sensing element packaging 102 comprised of a thin silicon die 110 for differential pressure sensing. A piezoresistive Wheatstone bridge circuit 112 is formed in the die 110 and located near the edge of a thin diaphragm region 114.

The die 110 sits atop a pedestal 116, which is in turn attached to the bottom 118 of the housing 104 by an adhesive 120. Fluid that flows in the port 108 applies pressure to the bottom of diaphragm 122 formed by the placement of the die 110 over the port 108. The other fluid flows to the top of gel 124 and pressurizes the top of diaphragm 122. Arrow 123 represents pressure applied to the top of the diaphragm and arrow 133 represents pressure applied to the bottom of the diaphragm. A difference or differential between the pressure 123 applied downwardly and the pressure 133 applied upwardly causes the diaphragm 122 to deflect. The deflection caused by the pressure difference causes the piezoresistors in the bridge circuit 112 to change their physical dimensions which in turn changes their resistive values. The MEMS pressure sensing element 110 shown in FIG. 1B can be seen in FIG. 1A embedded in a conventional gel 124, an intended function of which is to protect the sensing element 110.

DETAILED DESCRIPTION

The gel 124 used in MEMS sensors tends to be bulky and massive. It can therefore adversely affect a MEMS pressure sensor responsiveness device during vibration.

Electrical charges in a gel 124 can also tend to distort the electrical properties of the piezoresistors from which the Wheatstone bridge circuits are formed. A differential pressure sensor that can eliminate the need for gel would be an improvement over the prior art.

Figure 1A:
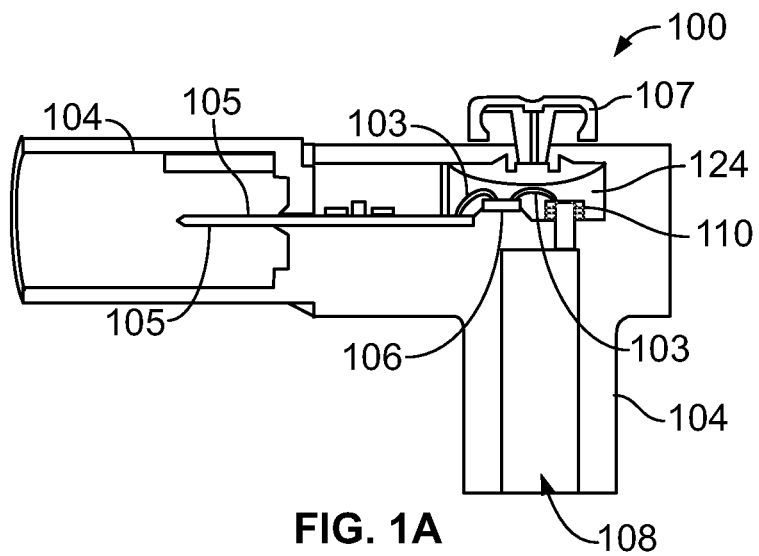
FIG. 1A is a cross-sectional view of a prior art differential pressure sensor.
Figure 1B:
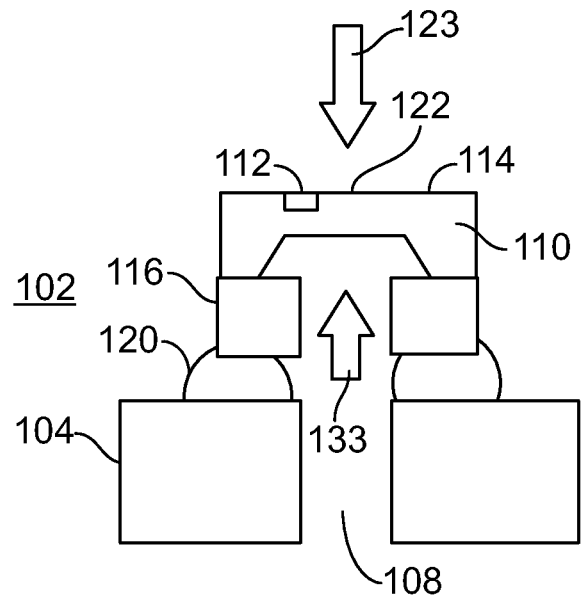
FIG. 1B is a cross-sectional view of a prior art MEMS sensing element packaged in the pressure sensor shown in FIG. 1A.
Figure 2:
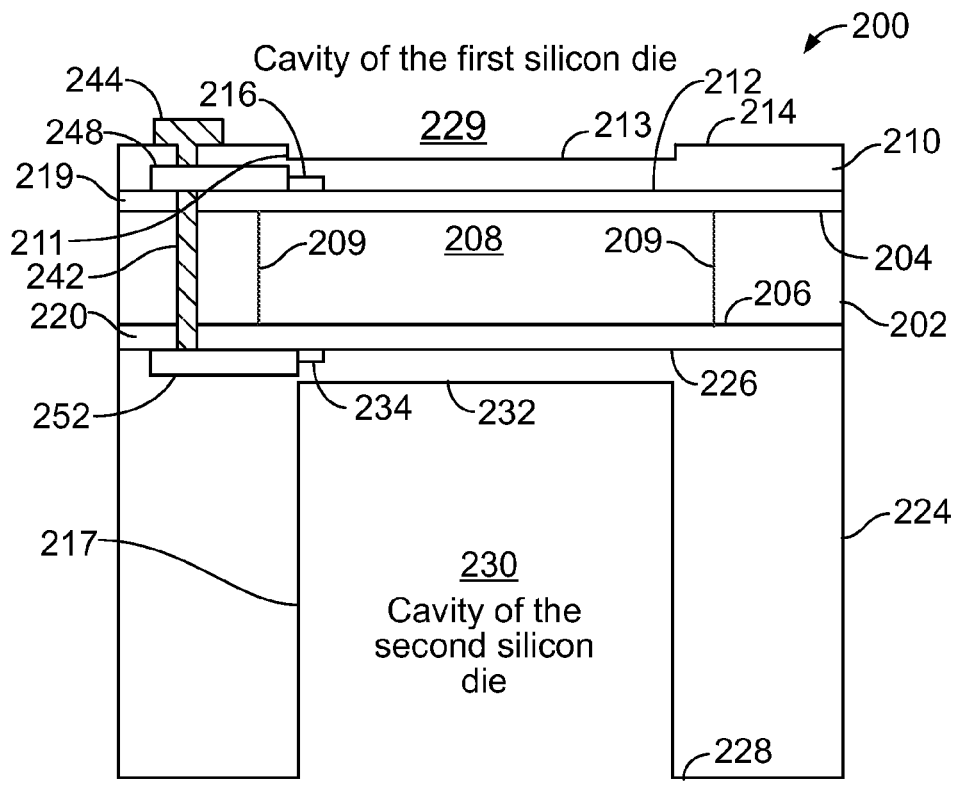
FIG. 2 is a cross-section of a differential pressure sensing element.

FIG. 2 is a cross-sectional diagram of a differential pressure sensing element 200 preferred embodiment. The pressure sensing element 200 is comprised of a spacer 202 having a top side 204 and a bottom side 206. A centrally-located hole 208 formed into the spacer 202 extends through the top side 204 and the bottom side 206. The hole 208 thus makes the spacer 202 hollow.

The hollow spacer 202 is preferably made of either amorphous or crystalline silicon but can be also made of borosilicate glass. Silicon dies can be attached to the silicon spacer 202 using silicon-to-silicon bonding. Silicon dies can be attached to a borosilicate glass spacer 202 by anodic bonding.

In FIG. 2, the top side 204 of the hollow spacer 202 is overlaid with a first silicon die 210 having a thickness between about 5 and about 100 microns. The first silicon die 210 can also be considered a "top" die in that it is attached to the top side 204 of the spacer 202. A first side 212 of the top die 210 faces downwardly, i.e., toward the top side 204 of the hollow spacer 202. An opposite second side 214 of the die 210 faces upwardly, i.e., away from the top side 204 of the spacer 202 and is formed to have a recess or cavity 229. The die 210 covers the top side 204 of the hollow spacer 202, including the hole 208, which extends through the spacer 202.

A first piezoresistive Wheatstone bridge circuit 216 is formed in the first side 212 of the die 210 near the side wall 211 of the cavity 229 of the first silicon die 210. The first Wheatstone bridge circuit 216 is therefore located near the edge of the diaphragm 213 formed by the first silicon die 210. The first silicon die 210 is attached to the top side 204 of a hollow silicon spacer 202 by silicon-to-silicon bonding provided by a silicon oxide layer 219.

A second silicon die 224 is attached to the bottom side 206 of the hollow spacer 202 by a second oxide layer 220. Since the second silicon die 224 is attached to the bottom side 206 of the spacer 202, it is also referred to as a bottom die 224. It also covers the hole 208 formed into the spacer 202.

Figure 7:
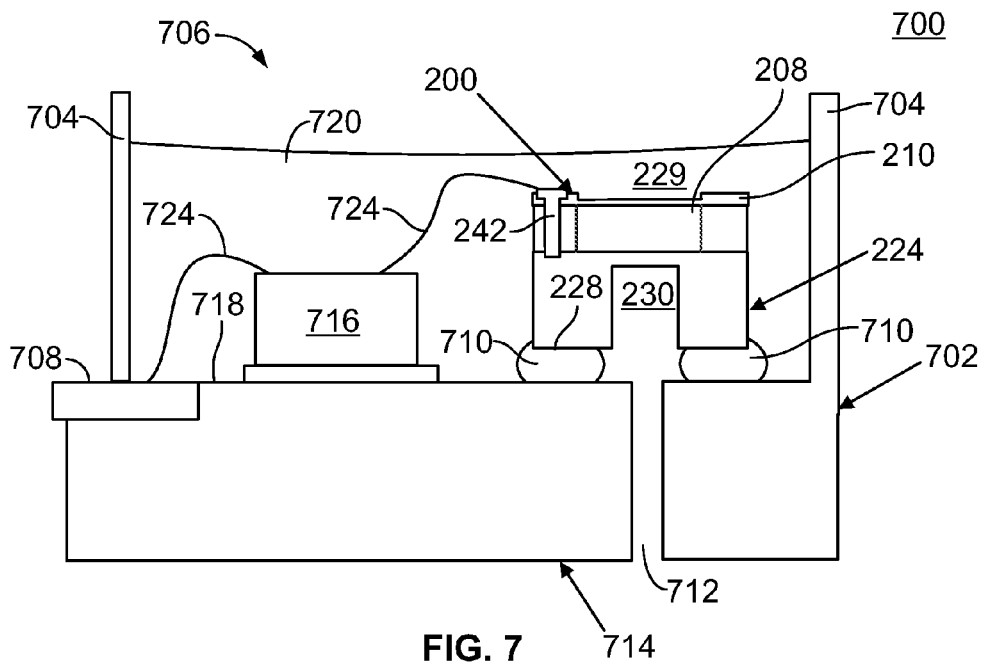
FIG. 7 is a cross-sectional view of a pressure sensor embodiment using the pressure sensing element depicted in FIG. 2 with Embodiment 1 as shown in FIGS. 4A-4F or FIG. 2 with Embodiment 2 as shown in FIGS. 6A-6F.

The second silicon die 224 is not necessarily thicker than the first silicon die 210. The thicker die is attached to the port for better sensor packaging to isolate the thermal stress from the substrate. As shown in FIG. 7 with wire bonding, the thicker die is the second silicon die 224. Nevertheless in FIG. 8 with flip-chip bonding, the thicker die is the first silicon die 210. The second silicon die 224 has a top or first side 226 and a bottom or second side 228. The top or first side 226 of the faces upwardly, i.e., toward the bottom 206 of the hollow spacer 202. The second side 228 of the second silicon die 224 faces downwardly and is processed to have a pressure cavity 230 that extends upwardly from the bottom 228 of the second die 224 toward the top side 226. The pressure cavity 230 stops near the first side 226 of the second die 224 to define a thin membrane or diaphragm 232. The thickness of the diaphragm 232 in the second die 224 is between about 5 and about 100 microns.

A second Wheatstone bridge circuit 234 is formed into the first side 226 of the second silicon die 224. The second Wheatstone bridge circuit is located in the first side 226 of the second silicon die 224 near and above the edge 217 of the pressure cavity 230, which is formed from the second side 228 of the second die 224 toward the first side 226 of the second die 224. The first die 210 and the second die 224 cover the hole 208 of the spacer 202 to form a vacuum cavity for the top and bottom absolute pressure sensing. The diaphragm 232 of the second die 224 deflects upwardly and downwardly responsive to pressure applied to the second die 224.

As with the first Wheatstone bridge circuit 216, the second Wheatstone bridge circuit 234 is formed near the sidewall 217 of the cavity 230. The second Wheatstone bridge 234 is therefore near the edge 217 of the diaphragm 232 comprised of the second die 224.

The two Wheatstone bridge circuits 216 and 234 are formed from piezoresistors deposited into the dies using known techniques. The values of the resistors change in response to the deformation of each respective diaphragm of the silicon dies. When a voltage is input to the Wheatstone bridge circuits, their output voltages change in response to deflection of the dies or the differential pressure on the dies. Electrical connections to the Wheatstone bridge circuits' inputs and outputs are provided by conductive layers formed into the respective dies.

When the hole 208 is covered by the first and second dies, both of which are bonded to the top and bottom sides of the spacer 202, the hole 208 becomes a hermetically sealed cavity 208. By sealing the hole 208 when it is at least partially evacuated, as will happen when the dies and spacer are assembled in an evacuated chamber, a negative pressure or vacuum is maintained inside the evacuated cavity formed by the evacuated hole 208 and the two dies that cover and seal it. When different pressures are applied against the two dies, their vertical deflections, relative to each other will differ causing the resistive values of piezoresistors within the dies to change in value.

Figure 3:
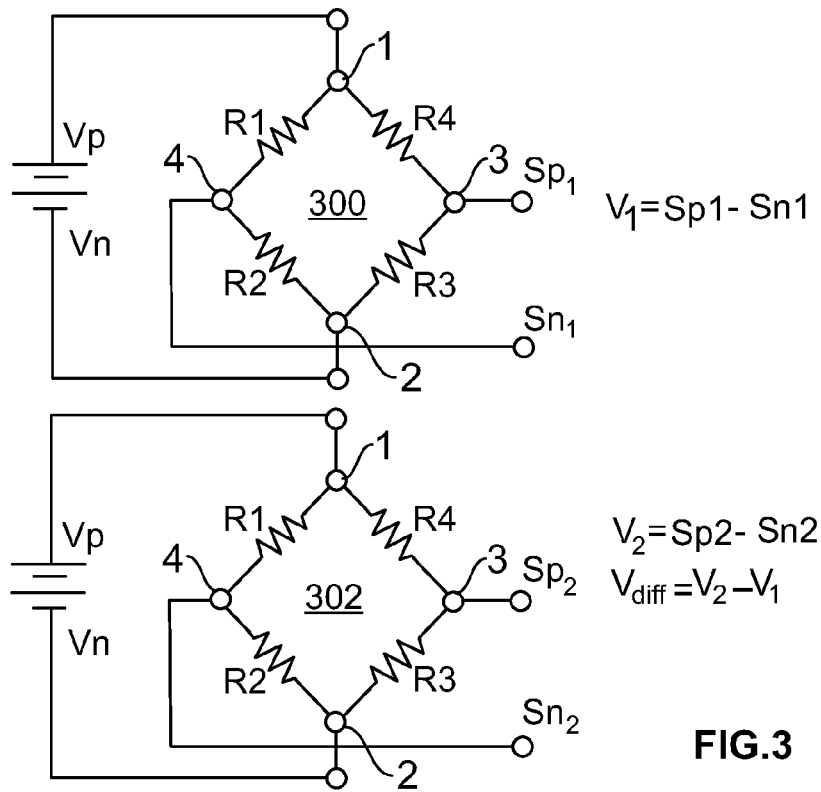
FIG. 3 shows how two Wheatstone bridge circuits are connected in a first embodiment.

FIG. 3 shows a first topology of two Wheatstone bridge circuits 300 and 302 formed using four, "R"-valued piezoresistors formed into the silicon dies using processes known in the prior art. Resistors R1 and R2 are connected in series to each other. Resistors R3 and R4 are connected in series to each other. The series-connected R1 and R2 are connected in parallel to the series-connected R3 and R4.

The Wheatstone bridge circuits 300 and 302 have two input nodes denominated as $V_p$ and $V_n$ and two output nodes denominated as $S_p$ and $S_n$. $V_p$ is usually a small positive voltage, typically about three volts. $V_n$ is usually ground or zero volts but $V_n$ could also be a negative voltage. The nodes between the R-valued piezoresistors in the first silicon die 210 are provided with electrical interconnects 248 formed by P+ conductive silicon interconnects that are deposited onto the first side 212 of the first silicon die 210. The nodes between the R-valued piezoresistors in the second silicon die 224 are provided with electrical interconnects 252 formed by P+ conductive silicon interconnects that are deposited onto the first side 226 of the second silicon die 224. The node between R1 and R4 is considered to be the first input node $V_p$ and is denominated node 1; the node between R2 and R3 is considered to be the second input node $V_n$ and is denominated node 2 The node between R3 and R4 is the first output node $S_p$ and is denominated node 3. The node between R1 and R2 is the second output node $S_n$ and is denominated node 4.

FIG. 3 shows how the two Wheatstone bridge circuits 300 and 302 are connected in a first embodiment of a differential pressure sensing element 200. As shown in FIG. 3, the two Wheatstone bridge circuits are independent from each other. A direct current voltage is connected to $V_p$ and $V_n$, i.e., to nodes 1 and 2 respectively The output voltage of the first circuit 300 is taken from $S_p$ and $S_n$, which are nodes 3 and 4 respectively The voltage difference between the voltages at $S_p$ and $S_n$ is the output voltage.

When a voltage is input to the input terminals $V_p$ and $V_n$, which are nodes 1 and 2, the output voltage at the output terminals $S_p$ and $S_n$ changes in response to changes in the values of the piezoresistors. Since the piezoresistors are formed into the diaphragms 213 and 232 of the thin silicon dies 210 and 224, the nominal resistance of R ohms will change when the diaphragms deflect in response to pressures applied to the diaphragms. In a first embodiment of the pressure sensing element 200, the voltage difference Vdiff between the output voltage V1 (V1=Sp1−Sn1) from the first bridge circuit 300 and the output voltage V2 (V2=Sp2−Sn2) from the second bridge circuit 302 represents a pressure difference, i.e., the difference in pressure applied to the first silicon die 210 and the pressure applied to the second silicon die 224.

Electrical connections to the R-valued resistors that form the first Wheatstone bridge circuit 216 are provided by P+ conductive silicon interconnects 248 formed into the first side 212 of the die 210. The P+ conductive silicon interconnects 248 extend from the R-valued piezoresistors over to conductive vias 242 located near the edge of the die 210 and which extend through the die 210 from the first side 212 to its second side 214. The vias 242 that extend through the die 210 terminate at conductive bond pads 244 on the second side 214 of the die 210.

As described more fully below with regard to FIG. 7, wires are connected to the bond pads 244 that extend to an ASIC, best seen in FIG. 7.

Electrical connections of the R-valued piezoresistors of the second Wheatstone bridge circuit 234 of the second silicon die 224 are also provided by way of P+ conductive silicon interconnect 252 formed on the top side 226 of the second silicon die 224. As with the first die 210, P+ conductive silicon interconnects 252 extend from the R-valued piezoresistors of the second Wheatstone bridge circuit 234 over to conductive vias 242 located near the edge of the second die 224 but which extend downwardly through the second oxide layer 220, from the hollow spacer 202. The vias 242 thus extend from the second set of P+ interconnects 252 on the first side 226 of the second die 224, upwardly through the second oxide layer 220, through the hollow spacer 202, through the first oxide layer 219, through the first silicon die 210 to the aforementioned bond pads 244 on the second side 214 of the first die 210.

Since FIG. 2 is a cross-section of the pressure sensing element 200, only one conductive via 242 is shown in the figure. Additional vias 242 not visible in FIG. 2 exist in the hollow spacer 202, the oxide layers 219 and 220, the first die 210 and the second die 224, which are in front of and behind the via 242 that is visible in FIG. 2. The vias 242, which are comprised of a conductive material formed into holes through the various layers, simply act as vertically-oriented conductors of electrical signals through the various layers of the pressure sensing element 200.

The conductive vias 242 are formed by etching holes in the hollow spacer 202, the first silicon die 210 and the second silicon die 224 at locations on each component, which are coincident with each other when the hollow spacer 202, oxide layers 219 and 220 and the dies 210 and 224 are assembled together as described above. The holes through the layers are filled with a conductive material, examples which include a metal or a doped silicon.

Additional understanding of the structure of the pressure sensing element 200 depicted in FIG. 2 can be had by other figures that depict the various layers shown in cross-section in FIG. 2.

Figure 4A:
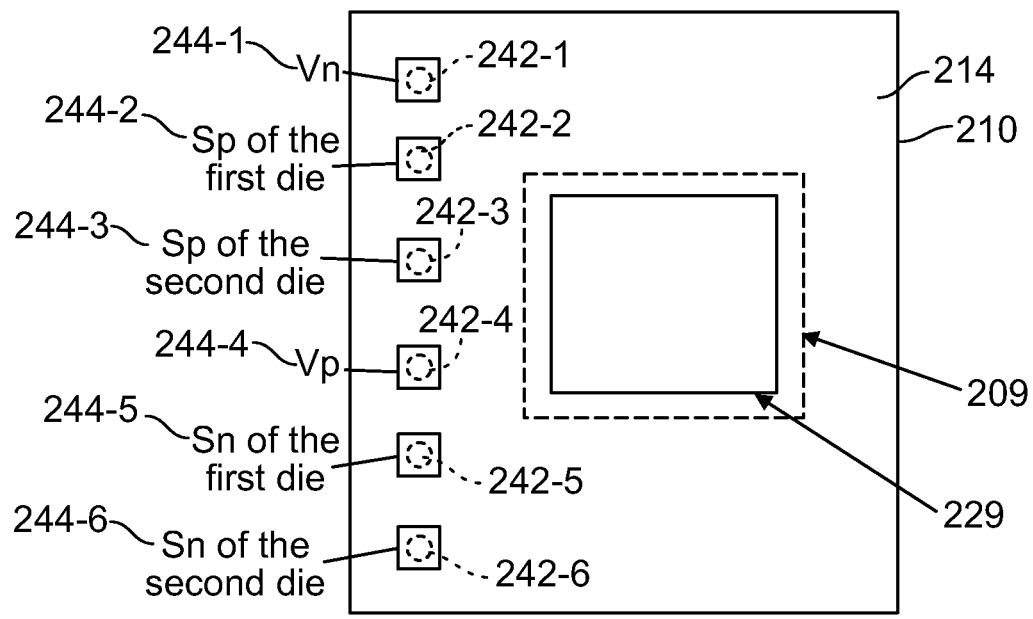
FIG. 4A is a view of the second side of the first silicon die and shows bond pads to which electrical connections are made.

FIG. 4A is a top view of the pressure sensing element 200 looking "downwardly" at the second side 214 of the first silicon die 210. The second side 214 of the first silicon die 210 faces away from the hollow spacer 202.

Six square or rectangular bond pads 244 are identified by reference numerals 244-1 to 244-6. The bond pads 244-1 to 244-6 are effectively on top of an in electrical connection with conductive vias 242 that extend downwardly, i.e., into the plane of FIG. 4A through the layers of the die 210 described above. The bond pads 244-4 and 244-1 are electrical contacts for the $V_p$ and $V_n$ power supply voltages that are provided to both Wheatstone bridge circuits 216 and 234. Bond pads 244-2 and 244-5 are electrical contacts for the output nodes $S_p$ and $S_n$ for the top or first Wheatstone bridge circuit 216, the electrical schematic of which is shown in FIG. 3 and identified by reference numeral 300. Bond pads 244-3 and 244-6 are electrical contacts for the output nodes $S_p$ and $S_n$ for the bottom or second Wheatstone bridge circuit 234, the electrical schematic of which is shown in FIG. 3 and identified by reference numeral 302. The above layout is only to demonstrate one of functional designs. The layout of bond pads, conductive interconnects, and vias can be designed in many other different ways.

In FIG. 4A, reference numeral 209 points to a square drawn using a broken line. The square 209 depicts the "footprint" of the sidewall of the hole 208 in the hollow spacer 202, which lies below the die 210. The square 229 shows the sidewalls of the cavity on the second side 214 of the first silicon die 210.

Figure 4B:
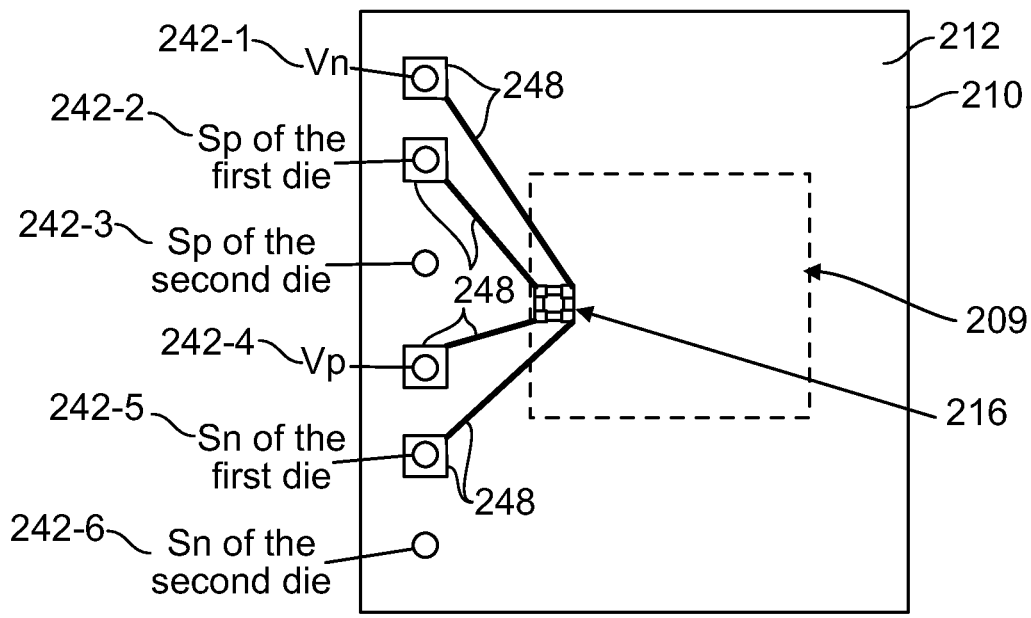
FIG. 4B shows the first side of a first silicon die and connections to a first Wheatstone bridge circuit thereon.

FIG. 4B is the first side 212 of the first silicon die 210. Stated another way, FIG. 4B and FIG. 4A are opposite sides of the first silicon die 210.

In FIG. 4B, the first Wheatstone bridge circuit 216 is comprised of four, R-valued P− silicon piezoresistors electrically connected to each other as shown in the first Wheatstone bridge circuit 300 in FIG. 3. Reference numeral 209 identifies the side wall of the hole 208 in the hollow spacer 202, and which is covered by the first silicon die 210.

As shown in FIG. 3, the Wheatstone bridge circuits have input nodes denominated as $V_p$ and $V_n$. The output nodes of the bridge circuits are denominated as $S_p$ and $S_n$. In FIG. 4B, the positive and negative supply voltages, $V_p$ and $V_n$ for the bridge circuit 216 are available at the left-hand side of the die 210 because of the aforementioned conductive vias 242 that extend through the die 210. In FIG. 4B, the two conductive vias identified for consistency purposes by reference numerals 242-4 and 242-1 are connected to the $V_p$ and $V_n$ input nodes of the Wheatstone bridge 216 via conductive traces 248 formed from P+ conductive silicon interconnects deposited onto the first surface 212 of the first die 210. In the figure, the output nodes $S_p$ and $S_n$ of the first Wheatstone bridge 216 are connected to two other conductive vias, which for consistency purposes are identified in the figure by reference numerals 242-2 and 242-5.

In FIG. 4B, reference numerals 242-3 and 242-6 "point" to two circles, which are top views of two conductive vias that extend through the first die 210 but which extend electrical connections downwardly to lower layers of the pressure sensing element 200. The vias 242-3 and 242-6 carry signals from the Sp and Sn output nodes of the "bottom" or second Wheatstone bridge circuit 234, which is located in the second die 224.

Figure 4C:
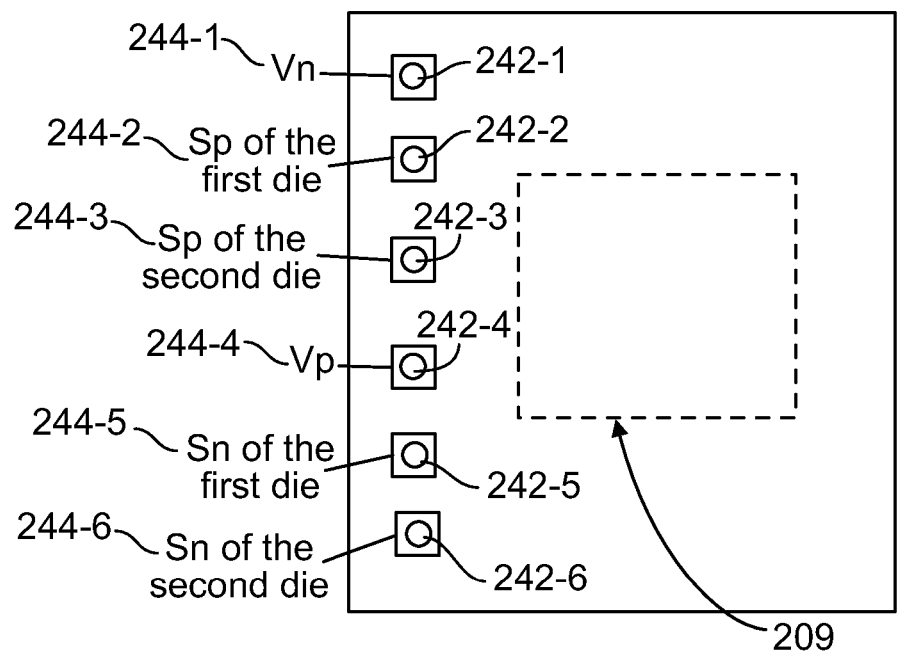
FIG. 4C shows the bond pad on the oxide layer between the first silicon die and the hollow spacer.

FIG. 4C is the first silicon oxide spacer or layer 219, which is located between the first silicon die 210 and the hollow spacer 202. The oxide layer 219 provides a silicon-to-silicon bond between those two structures. Six squares or rectangles located at the left-hand side of FIG. 4C on the oxide layer 219 between the hollow spacer 202 and the first die 210 are metal bond pads that are identified by reference numerals 244-1 to 244-6 to carry the electrical signals $V_n$, $S_p$ for the first die, $S_p$ for the second die, $V_p$, $S_n$ for the first die, and $S_n$ for the second die, respectively. Reference numerals 242-1 through 242-6 identify the vias that extend through the hollow spacer 202 and through the first die 210. Reference numeral 209 identifies the sidewall of the hole 208 through the spacer 202, which the oxide layer 219 is overlaid.

Figure 4D:
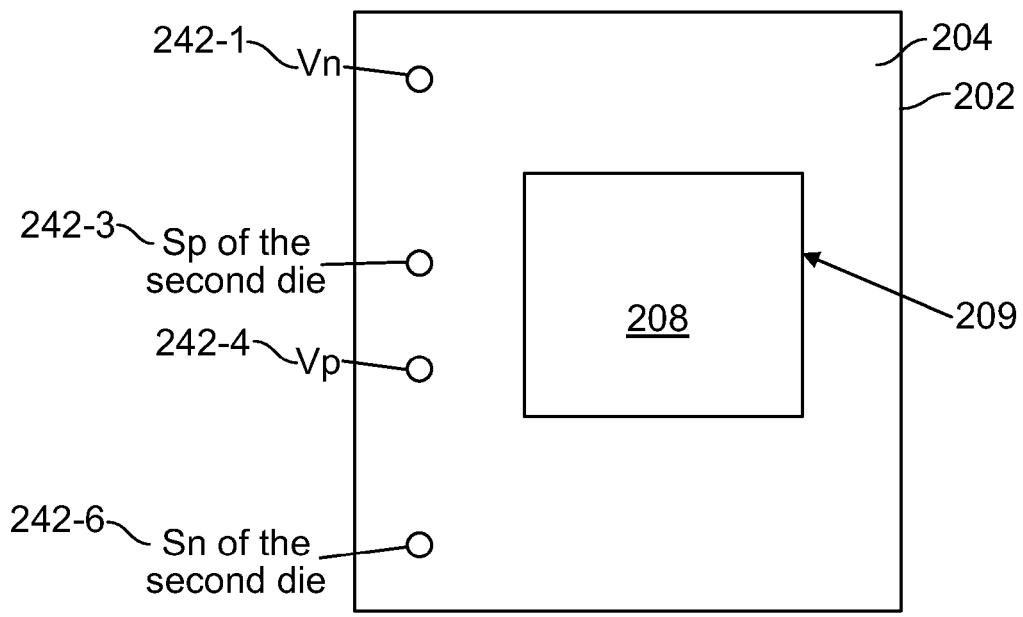
FIG. 4D shows the vias through the hollow spacer.

FIG. 4D is a top or first side 204 of the hollow spacer 202. Four conductive vias 242-1, 242-3, 242-4, and 242-6 extend through the hollow spacer 202 downwardly, i.e., into the plane of FIG. 4D, and are represented by four circles at the left-hand side of the figure. As shown in FIG. 2, which is a cross section of the pressure sensing element 200, the vias 242 extend "vertically" through the hollow spacer 202 down to the second die 224, which is attached to the lower or second side 206 of the hollow spacer 202, which is where the lower or second Wheatstone bridge circuit 234 is located in the pressure sensing element 200. In FIG. 4D, reference numeral 209 represents the sidewall of the hole 208 through the spacer 202. The vias 242-1, 242-3, 242-4, and 242-6 carry signals through the hollow spacer 202 to and from the second Wheatstone bridge circuit 234 on the second silicon die 224.

Figure 4E:
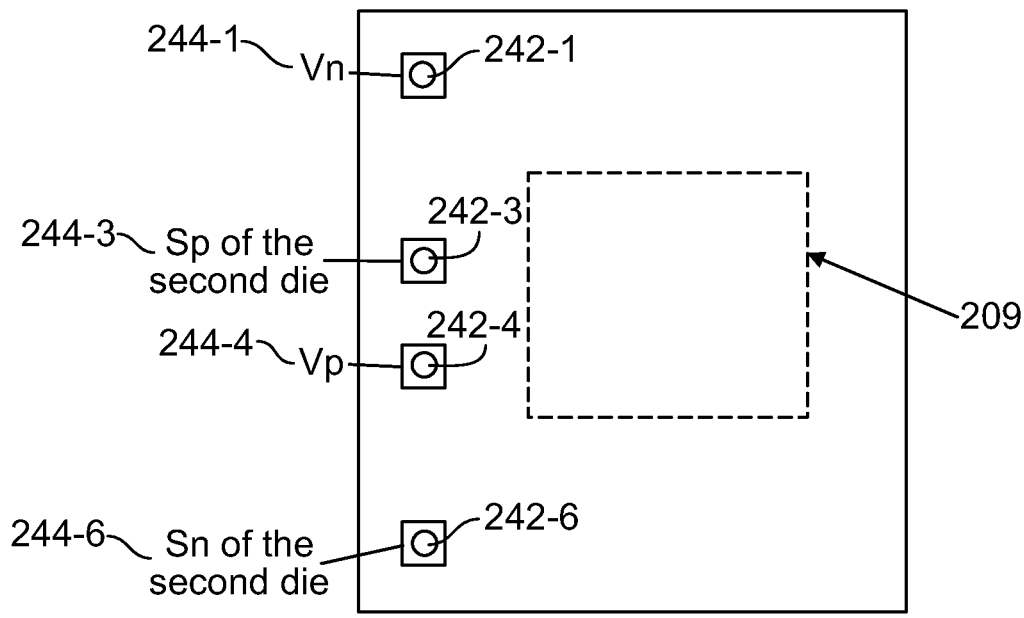
FIG. 4E shows the bond pads on the oxide layer between the hollow spacer and the second silicon die.

FIG. 4E is the lower or second silicon oxide layer 220. As shown in FIG. 2, it is located between the bottom of the second side 206 of the hollow spacer 202 and the top or first side 226 of the second silicon die 224. Reference numeral 209 identifies the sidewall of the hole 208 formed into the hollow spacer 202 and around which the oxide layer 220 is attached.

In FIG. 4E, the four small squares on the left-hand side of the figure identified by reference numerals 244-1, 244-3, 244-4 and 244-6 identify electrically conductive metal bond pads surrounding conductive vias 242-1, 242-3, 242-4 and 242-6 that carry signals $V_n$, $S_p$, $V_p$ and $S_n$ for the second Wheatstone bridge 234 of the second die 224 respectively.

Figure 4F:
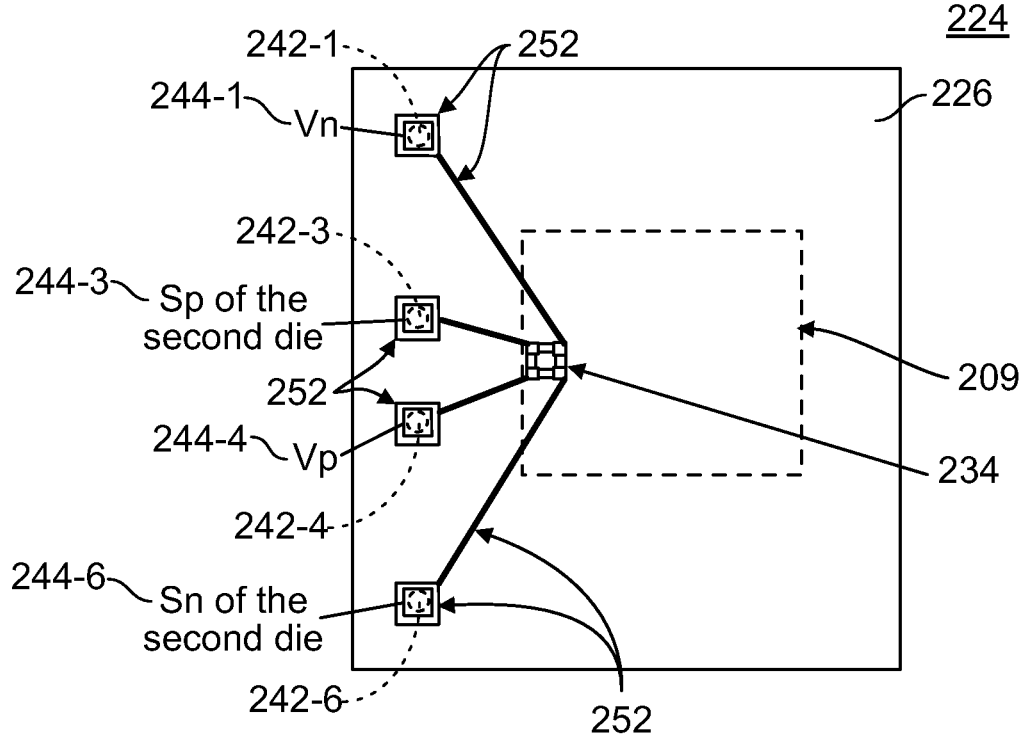
FIG. 4F shows the first side of a second silicon die and connections to a second Wheatstone bridge circuit thereon.

FIG. 4F depicts the top or first side 226 of the second silicon die 224, which is located between the second oxide layer 220 and the lower or second side 228 of the second silicon die 224. Reference numeral 209 identifies the sidewall of the hole 208 formed into the hollow spacer 202. The piezoresistors that comprise the second Wheatstone bridge circuit 234 are electrically connected by P+ interconnects 252 to four, electrically conductive P+ areas 252, which surround bond pads identified by reference numerals 244-1, 244-3, 244-4 and 244-6. The P+ conductive squares 244-1, 244-3, 244-4 and 244-6 are electrically connected to the vias for $V_n$, $S_p$, $V_p$ and $S_n$ for the second Wheatstone bridge 234 respectively Those vias are identified by reference numerals 242-1, 242-3, 242-4 and 242-6.

Figure 5:
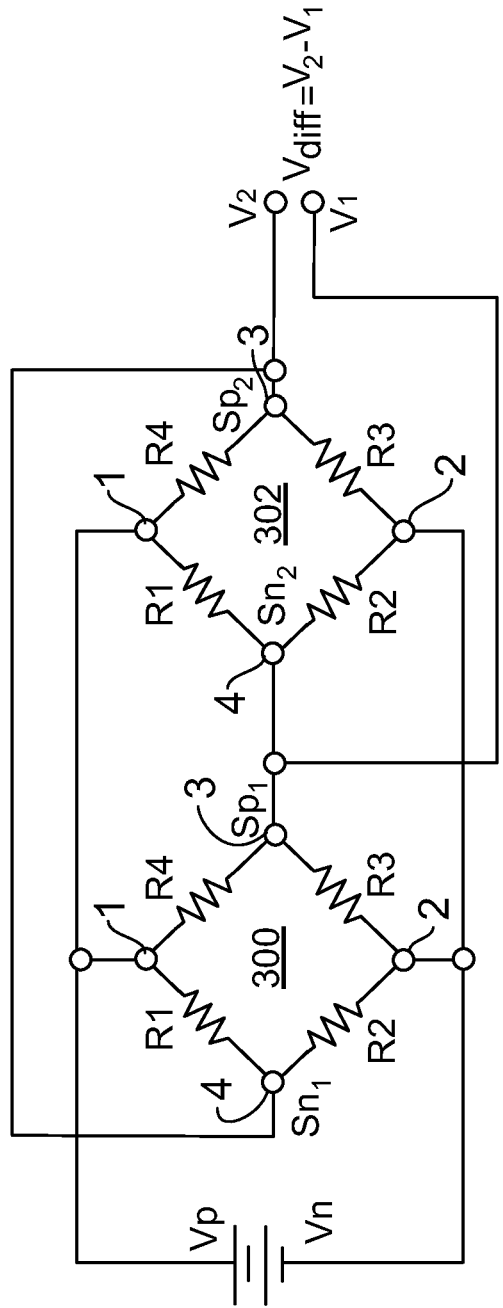
FIG. 5 shows how two Wheatstone bridge circuits are connected in a second embodiment.

FIGS. 4A-4F depict the layers of a first embodiment of a differential pressure sensor shown in cross section in FIG. 2. Six bond pads 244-1 through 244-6 on the top or second side 214 of the first silicon die 210 are required to electrically connect the Wheatstone bridge circuits. Two of the six bond pads are required to connect a power supply to each of the two input nodes $V_p$ and $V_n$ of the two Wheatstone bridge circuits. The other four bond pads are required for electrical connections to the $S_p$ and $S_n$ output nodes of the Wheatstone bridge circuits. In an alternate embodiment, the number of bond pads is reduced from six to four by interconnecting two nodes of the two Wheatstone bridge circuits, within the sensing element layers. FIG. 5 is a schematic diagram of the interconnection of two Wheatstone bridge circuits by which the two different output voltages of the two circuits can be determined directly from the circuits themselves. Stated another way, in FIG. 5, the output voltage $V_{diff}$ which requires only two bond pads, is the algebraic difference between the output voltage of the first Wheatstone bridge 300 and the second Wheatstone bridge circuit 302.

Figure 6A:
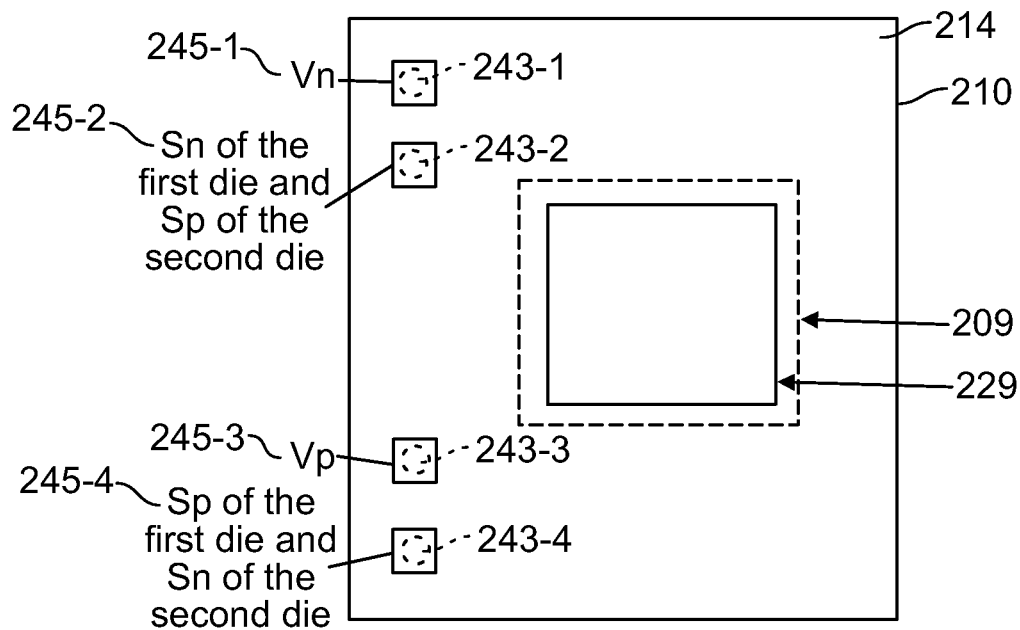
FIG. 6A is a view of the second side of the first silicon die and shows bond pads to which electrical connections are made.

FIG. 6A is a view of the second side 214 of the first silicon die 210 used in the aforementioned alternate embodiment of the pressure sensing element 200. Four bond pads 245-1, 245-2, 245-3 and 245-4 are electrically connected to conductive vias, which are identified in FIGS. 6A and 6B by reference numerals 243-1 to 243-4. The conductive vias 243-1 to 243-4 extend downwardly from the bond pads 245-1, 245-2, 245-3 and 245-4, into the plane of the figure. The conductive vias provide electrical connections to Wheatstone bridge circuits in the two dies. By cross connecting Sp and Sn of the two Wheatstone bridge circuits 300 and 302 as shown in FIG. 5, only four bond pads, i.e., bond pads 245-1 through 245-4, and four vias 243-1 through 243-4 are required to provide all of the connections between the Wheatstone bridge circuits and external circuits that are necessary to measure changes in the values of the piezoresistors.

In FIG. 5, the $V_1$ output node is electrically connected to the $S_n$ node of the second Wheatstone bridge circuit 302 and to the $S_p$ node of the first Wheatstone bridge circuit 300. In FIG. 6A, reference numeral 245-2 identifies a bond pad that is labeled as both $S_n$ of the first die and $S_p$ of the second die.

Figure 6B:
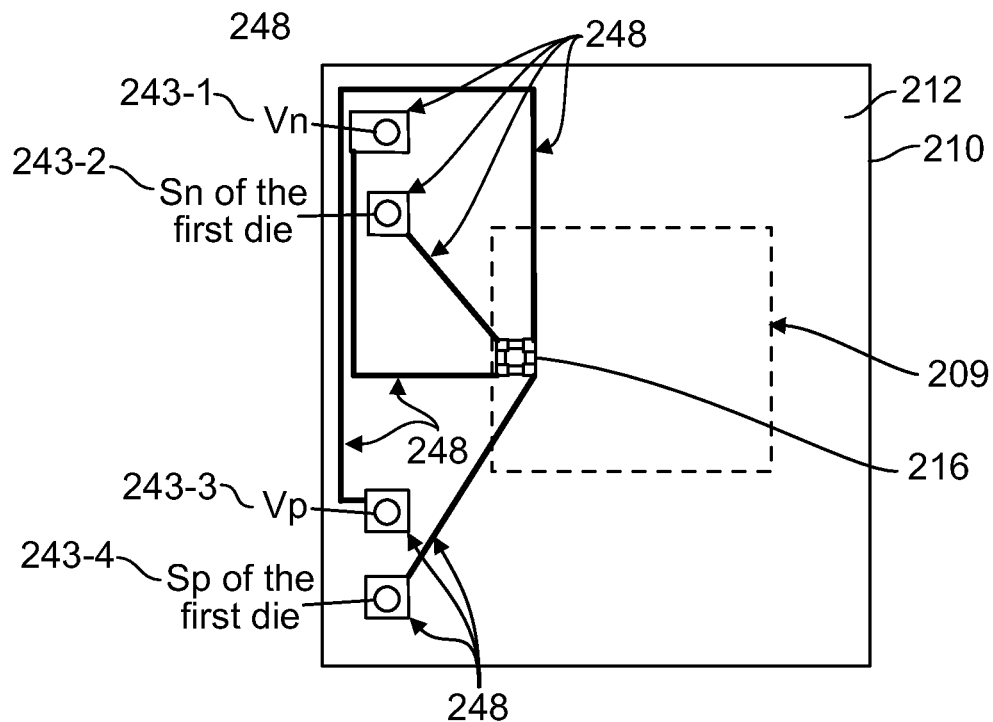
FIG. 6B shows the first side of a first silicon die and connections to a first Wheatstone bridge circuit thereon.

In FIG. 5, the $V_2$ output node is electrically connected to the $S_p$ node of the second Wheatstone bridge circuit 302 and to the $S_n$ node of the first Wheatstone bridge circuit 300. In FIG. 6A, reference numeral 245-4 identifies a bond pad connected to $S_p$ of the first silicon die 210 and $S_n$ of the second silicon die 224. As shown in FIG. 6B, P+ interconnects 248 formed on the first side 212 of the first silicon die 210 provide the necessary electrical connections between the $S_p$ and $S_n$ nodes of the two circuits to reduce the number of bond pads from six to four.

FIG. 6B depicts the layout of P+ interconnects 248 on the first side 212 of the first die 210. Reference numeral 209 identifies the sidewall of the hole 208 formed into the first side 204 of the hollow spacer 202. The hole 208 lies below the die 210. Reference numerals 243-1, 243-2, 243-3 and 243-4 identify conductive vias through the die 210. The P+ interconnects 248 electrically connect the vias to the piezoresistors of the first Wheatstone bridge 216.

Figure 6C:
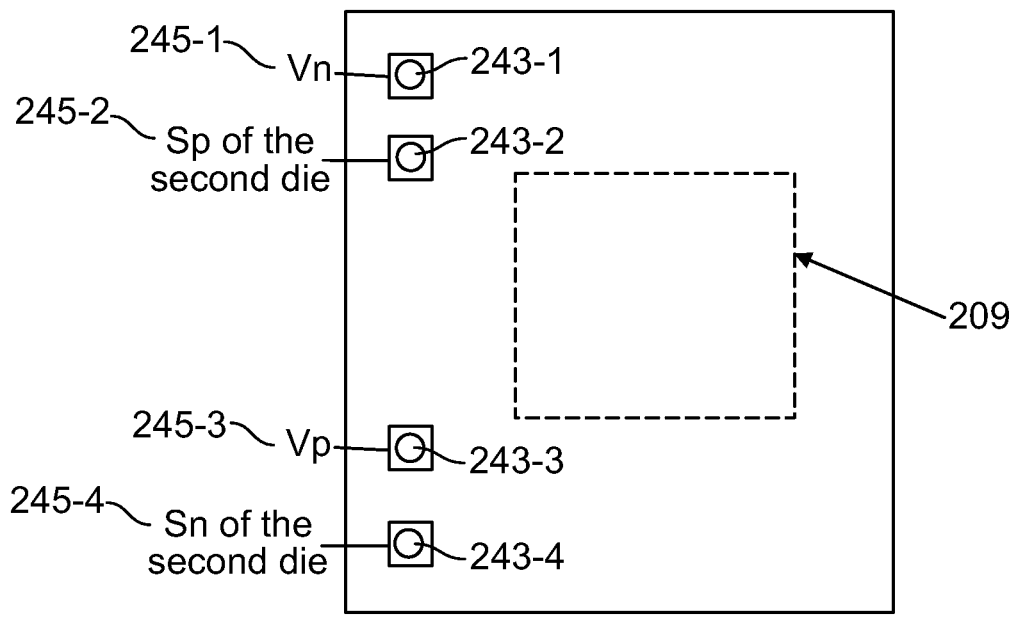
FIG. 6C shows the bond pad on the oxide layer between the first silicon die and the hollow spacer.

FIG. 6C depicts the layout of the first oxide layer 219 used in the second embodiment of the pressure sensing element 200. The first oxide layer 219 is located between the top of the first surface 204 of the hollow spacer 202 and the first side 212 of the first silicon die 210. Reference numerals 245-1 through 245-4 identify four square or rectangular metal bond pads that make electrical contact with conductive vias 243-1 through 243-4 that extend through the hollow spacer 202 and which make electrical contact with the vias that extend through the first silicon die 210.

Figure 6D:
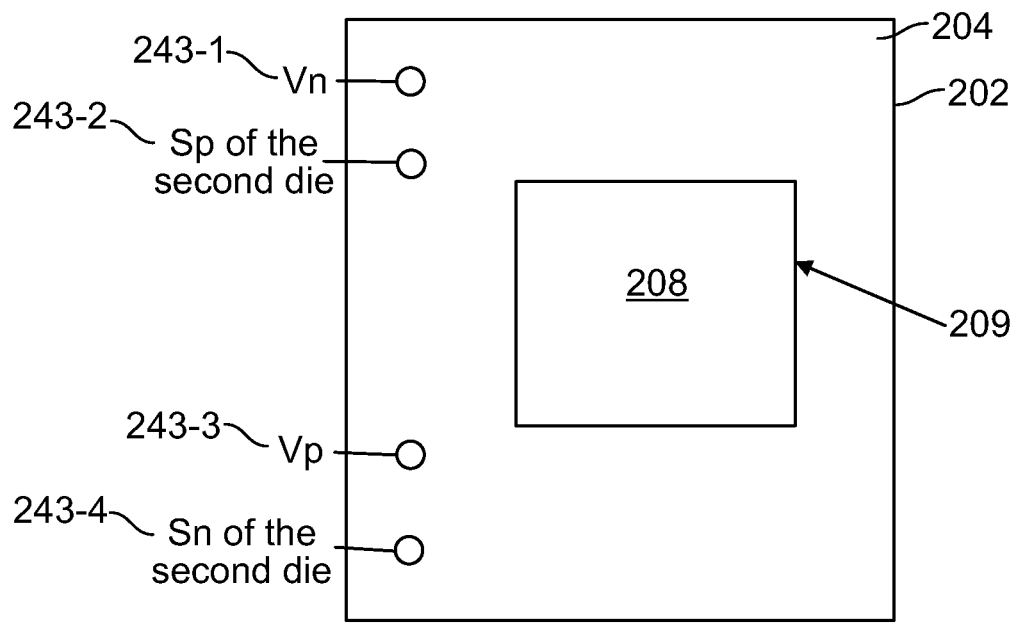
FIG. 6D shows the vias through the hollow spacer.

FIG. 6D shows the first side 204 of the hollow spacer 202 that is used with the alternate embodiment of the pressure sensing element 200. Four conductive vias on the left-hand side of the figure are labeled 243-1 through 243-4. The first conductive via 243-1 carries the $V_n$ supply voltage for both Wheatstone bridge circuits. The second conductive via 243-2 is connected to the $S_n$ output node of the first die as well as the $S_P$ output node of the second die. The third conductive via 243-3 is connected to the $V_P$ input voltage for both Wheatstone bridge circuits. The fourth conductive via 243-4 carries the $S_P$ output node of the first silicon die and the $S_n$ output node of the second silicon die. Reference numeral 209 identifies the sidewall of the hole 208 formed through the spacer 202.

Figure 6E:
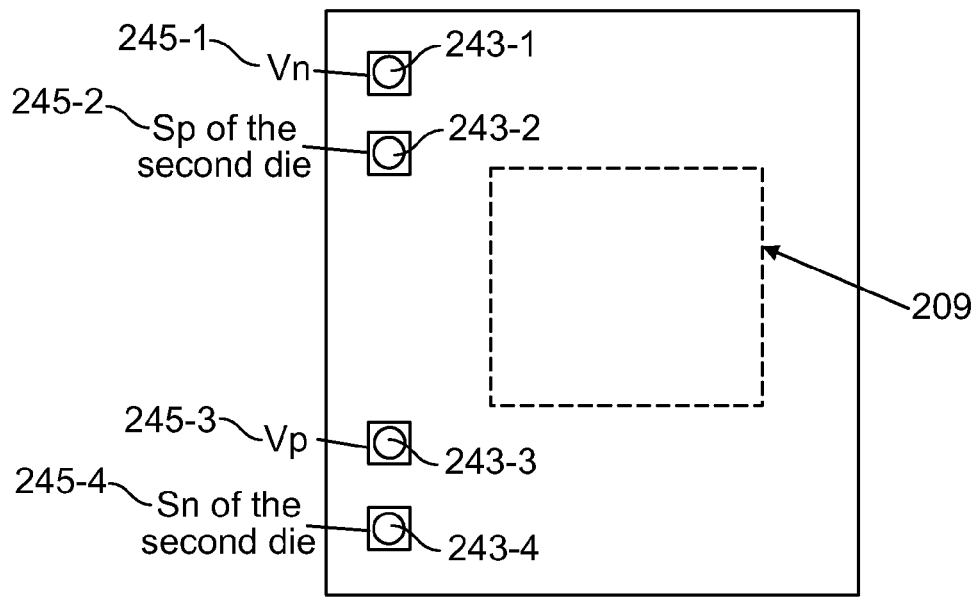
FIG. 6E shows the bond pads on the oxide layer between the hollow spacer and the second silicon die.

FIG. 6E shows the layout of the second or lower oxide layer 220, which is located between the second side 206 of the hollow spacer 202 and the bottom or second die 224. In FIG. 6E, reference numeral 209 shows where the sidewall of the hole 208 through the spacer 202 is located.

Figure 6F:
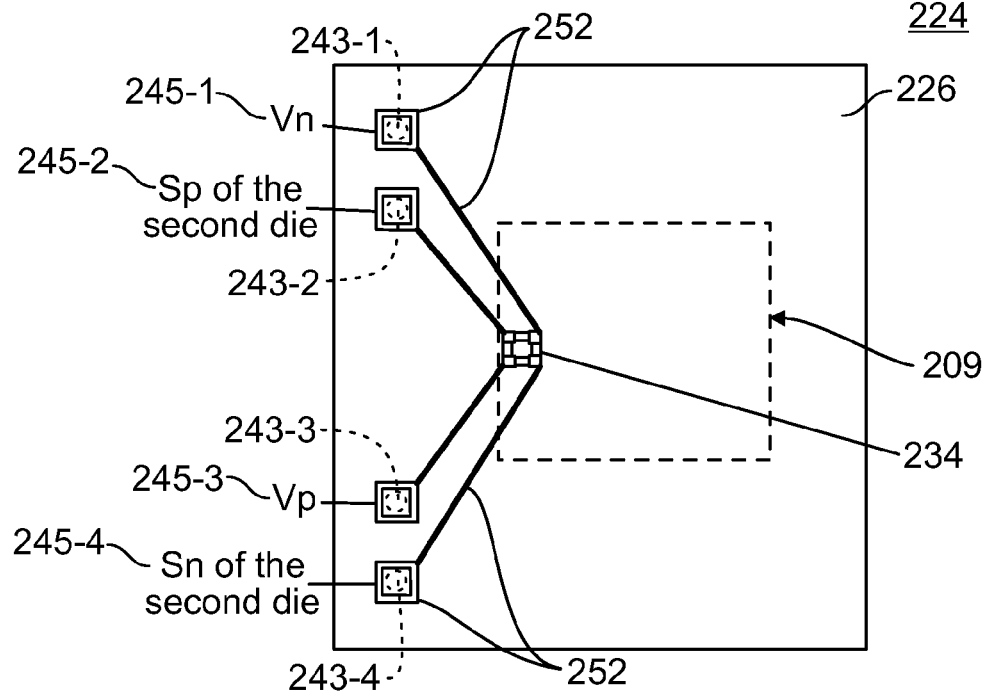
FIG. 6F shows the first side of a second silicon die and connections to a second Wheatstone bridge circuit thereon.

Finally, FIG. 6F shows the layout of the top or first side 226 of the second silicon die 224. P+ interconnects 252 connect the metal bond pads $V_p$ 245-3 and $V_n$ 245-1 to the piezoresistors of the second Wheatstone bridge 234 as shown. Other P+ interconnects 252 connect the output nodes of the Wheatstone bridge circuit 234 to bond pads 245-2 and 245-4 and making electrical contact with conductive vias 243-2 and 243-4. Reference numeral 209 identifies the location of the sidewalls of the hole 208 formed into the spacer 202.

A comparison of FIGS. 6B and 6F shows that $S_p$ node of the Wheatstone bridge circuit 216 on the first die 210 is electrically connected to the $S_n$ node of the Wheatstone bridge circuit 234 on the second die 224. Similarly, the $S_n$ node of the Wheatstone bridge circuit 216 on the first die 210 is electrically connected to the $S_p$ node of the Wheatstone bridge circuit 234 on the second die 224. By cross-connecting the $S_p$ and $S_n$ nodes of the two Wheatstone bridge circuits within the sensor structure, the number of bond pads required to make connections to the sensor can be reduced from six to four.

FIG. 7 is a cross-sectional view of a complete sensor 700. The complete sensor 700 is comprised of a pressure sensing element 200 as described above, mounted in a plastic housing 702. The housing 702 is comprised of a side wall 704 that surrounds a pocket 706, which is optionally filled with a protective gel 720. The floor or bottom 718 of the pocket 706 supports the pressure sensing element 200 on small dollops 710 of adhesive that provide a seal around the opening 230 in the bottom 228 of the second die 224. A pressure port 712 is formed through the base 714 of the housing 702, which permits liquid or gaseous fluids to apply pressure to the second silicon die 224.

An application specific integrated circuit (ASIC) 716 is adhesively bonded to the floor or bottom 718 of the pocket 706. The gel, 720, if used, protects the pressure sensing element 200, the ASIC 716, and bond wires 724 that extend from the bond pads 244 of the pressure sensing element to the bond pads (not shown) of the ASIC 716. Bond wires connecting the ASIC 716 to leadframes 708 are also protected by the gel 720.

Figure 8:
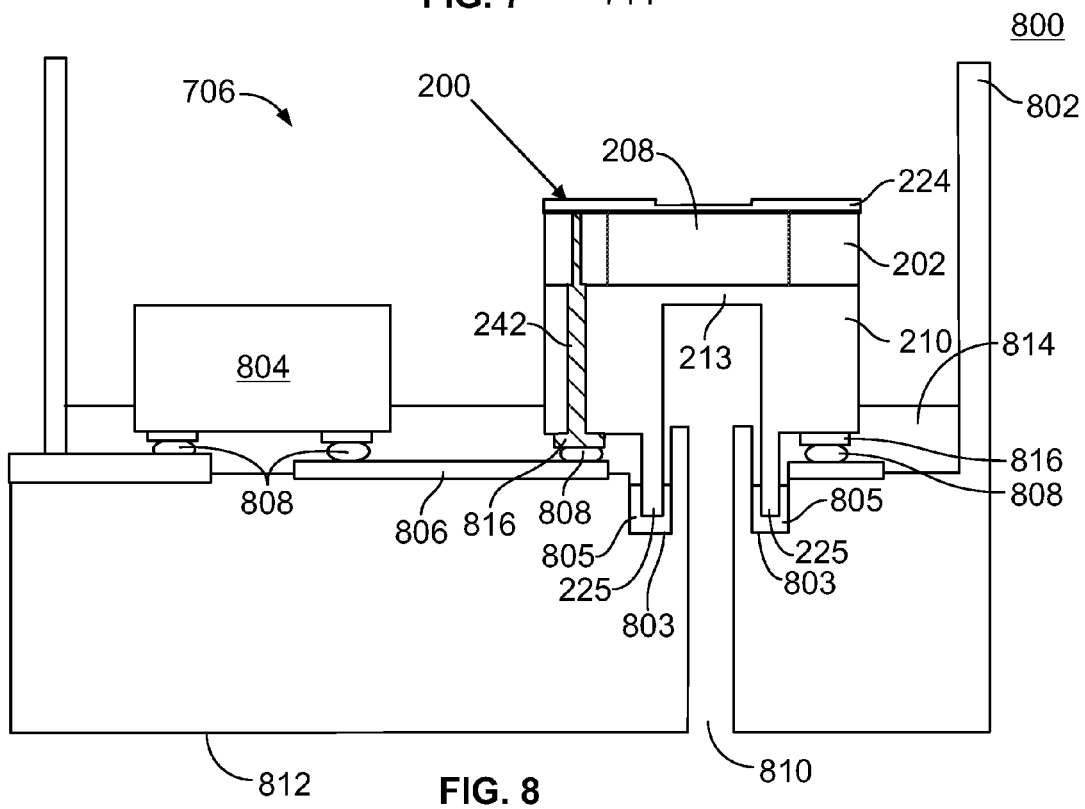
FIG. 8 is a cross sectional view of an alternate embodiment of a pressure sensor.

FIG. 8 is a cross-sectional view of an alternate embodiment of a pressure sensor 800, which uses "flip-chip" assembly techniques. A pressure sensing element 200 as described above sits within a housing 802 having an application specific integrated circuit (ASIC) 804, which provides signals to, and reads signals from the pressure sensing element 200. The pressure sensing element 200 is flip-chipped or upside down with a thicker substrate in the first silicon die 210 and a thinner substrate in the second silicon die 224. The first die 210 is formed to have a channel or tube protrusion 225 that extends downwardly from the second side of the first silicon die 210 and which fits inside a square or an annular groove 803 formed into the bottom of the housing 802. The groove 803 is partially filled with an adhesive 805, which holds the protrusion 225 in the groove 803.

Conductive lead frames 806 extend between ball grid arrays (BGA) or electrically conductive adhesive (ECA) 808 that attach both the ASIC 804 and the pressure sensing element 200 to the lead frames 806. Bond pads 816 located at the "bottom" of the pressure sensing element 200 are electrically connected to the lead frames 806 using a BGA or ECA 808. Conductive vias 242 described above carry signals to the bond pads 816 and BGA or ECA 808 from various layers of the pressure sensing element 200. A lower pressure port 810 extends through the base 812 of the housing 802 to allow liquids or fluids to exert pressure on the diaphragm 213 formed in the first silicon die 210.

One advantage of the pressure sensor depicted in FIG. 8 over the pressure sensor depicted in FIG. 7 is that in FIG. 8, gel is not overlaid the pressure sensing element 200. Another advantage is that wire bonding is not used. An optional under fill 814 surrounds the connections provided by a ball grid array (BGA) 808. The under fill 814, is used, acts as an encapsulant that reduces oxidation of the connections between the BGA 808 and the lead frames 806 and also helps to hold the pressure sensing element 200 and ASIC 804 during vibration or drop.

The foregoing description is for purposes of illustration only. The true scope of the invention is defined by the appurtenant claims.

What is claimed is:

1. A differential pressure sensing element, comprising:
   an electrically insulating hollow spacer having first and second sides and having a plurality of insulated conductive through-vias extending between the first and second sides;
   a first silicon die attached to the first side of the electrically insulating hollow spacer, the first silicon die having corresponding first and second sides, the first silicon die comprising a first piezoresistive Wheatstone bridge circuit on a first diaphragm formed into the first silicon die, the first Wheatstone bridge being connected to electrical interconnects on the first side of the first silicon die, the first silicon die additionally comprising a plurality of insulated conductive through-silicon vias (TSVs) extending between the first and second sides of the first silicon die, interconnecting the electrical interconnects with bond pads on the second side of the first silicon die; and
   a second silicon die attached to the second side of the electrically insulating hollow spacer, the second silicon die having corresponding first and second sides, the second silicon die comprising a second piezoresistive Wheatstone bridge circuit on a second diaphragm formed into the second silicon die, the Wheatstone bridge being connected to electrical interconnects on the first side of the second silicon die, the second silicon die additionally comprising a plurality of insulated conductive vias to interconnect the electrical interconnects of the second silicon die with four of the TSVs of the first silicon die with the bond pads of the first silicon die
   whereby the electrically insulating hollow spacer, the first silicon die and the second silicon die form a cavity for dual backside absolute pressure sensing.

2. The pressure sensing element of claim 1, wherein the cavity is at least partially evacuated.

3. The pressure sensing element of claim 1, wherein the hollow spacer is silicon, and wherein the hollow spacer is fusion bonded to the first and second dies.

4. The pressure sensing element of claim 1, wherein the hollow spacer is glass that is anodically bonded to the first and second silicon dies.

5. The pressure sensing element of claim 1, further comprising a first bonding layer attaching the first side of the first silicon die to the first side of the hollow spacer.

6. The pressure sensing element of claim 5, wherein the first bonding layer is silicon oxide.

7. The pressure sensing element of claim 1, further comprising a second bonding layer attaching the first side of the second silicon die to the second side of the hollow spacer.

8. The pressure sensing element of claim 7, wherein the second bonding layer is silicon oxide.

9. The pressure sensing element of claim 8, wherein the second bonding layer is a dielectric layer and configured to have a metal bond pad connecting a first end of the conductive via by a metal interconnect through a contact window in the dielectric layer.

10. The pressure sensing element of claim 1, wherein the conductive via has a first end and second end and the conductive via is comprised of at least one of:
    metal; and
    doped silicon.

11. The pressure sensing element of claim 1, wherein the piezoresistive Wheatstone bridge circuits are comprised of four nodes, the first and second nodes of the first bridge circuit are coupled to a first input voltage, the third node and fourth nodes of the first bridge circuit define a first absolute pressure output voltage, the first and second nodes of the second bridge circuit are coupled to a second input voltage, the third and fourth nodes of the second bridge circuit define a second absolute pressure output voltage, the difference between the first absolute pressure output voltage and the second absolute pressure output voltage being a voltage representative of the differential pressure between the first and second diaphragms.

12. The pressure sensing element of claim 1, wherein the piezoresistive Wheatstone bridge circuits are comprised of four nodes, the first and second nodes of the first circuit are coupled to corresponding first and second nodes of the second circuit, the third node of the first circuit is coupled to the fourth node of the second circuit at a first output node, and the fourth node of the first circuit is coupled to the third node of the second circuit at a second output node, and wherein the algebraic difference of signal levels at the first and second output nodes is representative of a pressure difference between the first and second diaphragms.

13. The pressure sensing element of claim 1, wherein the first and second piezoresistive Wheatstone bridge circuits are comprised of four nodes, first and second nodes of the first piezoresistive Wheatstone bridge circuit being configured to be coupled to a first input voltage, third node and fourth nodes of the first piezoresistive Wheatstone bridge circuit configured to provide a first output voltage across them, the first output voltage corresponding to a pressure, a first node of the second piezoresistive Wheatstone bridge circuit being connected to the first node of the first piezoresistive Wheatstone bridge circuit, a second node of the second piezoresistive Wheatstone bridge circuit being connected to the second node of the first piezoresistive Wheatstone bridge circuit, third and fourth nodes of the second piezoresistive Wheatstone bridge circuit configured to provide a second output voltage across them, the difference between the first output voltage and the second output voltage being a voltage representative of the differential pressure between the first and second diaphragms.

14. A pressure sensor comprised of:
a housing having a differential pressure sensing element and an integrated circuit (IC) electrically coupled to the differential pressure sensing element, the differential pressure sensing element comprising:
an electrically insulating hollow spacer having first and second sides, and having a plurality of conductive through-vias extending between the first and second sides;
a first silicon die attached to the first side of the electrically insulating hollow spacer, the first silicon die having corresponding first and second sides, the first silicon die comprising a first Wheatstone bridge circuit on a first diaphragm formed into the first silicon die, the first Wheatstone bridge circuit being connected to electrical interconnects on the first side of the first silicon die, the first silicon die additionally comprising a plurality of insulated conductive through-silicon vias (TSVs) extending between the first and second sides of the first silicon die, interconnecting the electrical interconnects with bond pads on the second side of the first silicon die;
a second silicon die attached to the second side of the electrically insulating hollow spacer, the second silicon die having corresponding first and second sides, the second silicon die comprising a second piezoresistive Wheatstone bridge circuit on a second diaphragm formed into the second silicon die, the second Wheatstone bridge circuit being connected to electrical interconnects on the first side of the second silicon die, the second silicon die additionally comprising a plurality of insulated conductive vias to interconnect the electrical interconnects of the second silicon die with four of the TSVs of the first silicon die with the bond pads of the first silicon die;
whereby the electrically insulating hollow spacer, the first silicon die and the second silicon die form a vacuum cavity.

15. The differential pressure sensor of claim 14, further comprising a gel covering the differential pressure sensor and the IC.

16. The differential pressure sensor of claim 14, further comprising a plurality of bond wires, configured to connect the differential pressure sensor to the IC and connect the IC to the conductive lead frames, the plurality of bond wires being embedded in the gel.

17. The differential pressure sensor of claim 14, wherein the housing has at least one port, coupled to one of the first and second diaphragms.

18. The differential pressure sensor of claim 14, wherein the housing has a plurality of conductive leadframes configured to carry electrical signals between the differential pressure sensing element and the IC, and wherein the conductive leadframes are coupled to the differential pressure sensing element and the IC by ball grid arrays (BGA).

19. The differential pressure sensor of claim 18, further comprising an underfill, substantially covering the BGAs.

20. The differential pressure sensor of claim 14, wherein the housing has a plurality of conductive leadframes configured to carry electrical signals between the differential pressure sensing element and the IC, and wherein the conductive leadframes are coupled to the differential pressure sensing element and the IC by an electrically conductive adhesive (ECA).

21. The pressure sensing element of claim 14, wherein the first and second circuits are piezoresistive Wheatstone bridge circuits comprised of four nodes, the first and second nodes of the first bridge circuit are coupled to a first input voltage, the third node and fourth nodes of the first bridge circuit define a first absolute pressure output voltage, the first and second nodes of the second bridge circuit are coupled to a second input voltage, the third and fourth nodes of the second bridge circuit define a second absolute pressure output voltage, the difference between the first absolute pressure output voltage and the second absolute pressure output voltage being a voltage representative of the differential pressure between the first and second diaphragms.

22. The pressure sensing element of claim 14, wherein the first and second circuits are piezoresistive Wheatstone bridge circuits, comprised of four nodes, the first and second nodes of the first circuit are coupled to corresponding first and second nodes of the second circuit, the third node of the first circuit is coupled to the fourth node of the second circuit at a first output node, and the fourth node of the first circuit is coupled to the third node of the second circuit at a second output node, and wherein the algebraic difference of signal levels at the first and second output nodes is representative of a pressure difference between the first and second diaphragms.

23. The pressure sensing element of claim 14, wherein the first and second piezoresistive Wheatstone bridge circuits are comprised of four nodes, first and second nodes of the first piezoresistive Wheatstone bridge circuit being configured to be coupled to a first input voltage, third node and fourth nodes of the first piezoresistive Wheatstone bridge circuit configured to provide a first output voltage across them, the first output voltage corresponding to a pressure, a first node of the second piezoresistive Wheatstone bridge circuit being connected to the first node of the first piezoresistive Wheatstone bridge circuit, a second node of the second piezoresistive Wheatstone bridge circuit being connected to the second node of the first piezoresistive Wheatstone bridge circuit, third and fourth nodes of the second piezoresistive Wheatstone bridge circuit configured to provide a second output voltage across them, the difference between the first output voltage and the second output voltage being a voltage representative of the differential pressure between the first and second diaphragms.

* * * * *